(12) United States Patent
Benner et al.

(10) Patent No.: US 6,980,102 B2
(45) Date of Patent: Dec. 27, 2005

(54) ALERT PROCESSING

(75) Inventors: Bradley A. Benner, Meridian, ID (US); Daniel J. Dyer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 10/455,690

(22) Filed: Jun. 4, 2003

(65) Prior Publication Data

US 2004/0246120 A1    Dec. 9, 2004

(51) Int. Cl.[7] ............................................. G08B 29/00
(52) U.S. Cl. .................. 340/506; 340/511; 340/539.1; 340/3.1; 340/825.36; 340/825.49
(58) Field of Search ..................... 340/506, 511, 539.1, 340/3.1, 825.36, 825.49; 700/17

(56) References Cited

U.S. PATENT DOCUMENTS

| 4,365,315 A | 12/1982 | Jamnik |
| 4,481,577 A | 11/1984 | Forson |
| 4,965,772 A | 10/1990 | Daniel et al. |
| 5,220,674 A | 6/1993 | Morgan et al. |
| 6,064,304 A | 5/2000 | Arrowsmith et al. |
| 6,275,855 B1 | 8/2001 | Johnson |
| 6,347,374 B1 | 2/2002 | Drake et al. |
| 6,373,383 B1 | 4/2002 | Arrowsmith et al. |
| 6,502,128 B1 | 12/2002 | Kumpf |
| 6,516,427 B1 | 2/2003 | Keyes et al. |
| 6,717,513 B1 * | 4/2004 | Sandelman et al. ......... 340/506 |

* cited by examiner

*Primary Examiner*—Daryl C Pope

(57) ABSTRACT

A system for processing alerts receives alerts from managed elements on different specific transport mechanisms. An interpreter converts alerts in different specific formats to a system format. A notifier notifies a user about the alert in a user identified manner. The system is modular in that functions may be added as components which are available to multiple modules. Managed elements may be queried to determine new types of alerts, and the state of an element. Further, multiple events may be correlated to determine the state of an element.

11 Claims, 11 Drawing Sheets

ALERT PROCESSING

FIELD OF THE INVENTION

The present invention relates to alerts and in particular to alert processing.

BACKGROUND OF THE INVENTION

Peripheral devices, such as printers and scanners are commonly connected to a network. This arrangement allows a number of client computers attached to the network to share the services of the network printer or the scanner. A multifunction peripheral (MFP) may combine the functions of these peripherals into a single peripheral. These MFPs may also be connected to a network peripheral server. Because the MFP may not know about the network if that information is localized to the server, the server must relay the messages or alerts representative of events sent by the MFP to a user in an efficient, timely and reliable manner. Typical events might include a user initiating a scan by the peripheral or delivering a received fax. It is important for the server to be able to relay the message correctly.

One problem the server faces is that alerts or event messages must be relayed only to the intended user(s) and no others. After receiving an event message, the server needs a way to identify the intended host(s) and be able to send that particular event message to that host(s).

One method involves using a Simple Network Management Protocol (SNMP) trap protocol to send alerts. Another method involves the server broadcasting events to all the hosts connected to the network. These methods provide a single way to send the events, and do not handle different data formats. Further, such methods do not handle unknown events well.

BRIEF DESCRIPTION OF THE DRAWINGS

The following drawings are various representations of embodiments of the invention. Other embodiments are within the scope of the claims herein.

DETAILED DESCRIPTION OF THE INVENTION

In the following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

The functions described herein are implemented in software in one embodiment, where the software comprises computer executable instructions stored on computer readable media such as memory or other type of storage devices. The term "computer readable media" is also used to represent carrier waves on which the software is transmitted. Further, such functions correspond to modules, which are software, hardware, firmware of any combination thereof. Multiple functions are performed in one or more modules or components as desired, and the embodiments described are merely examples.

Figure 1:
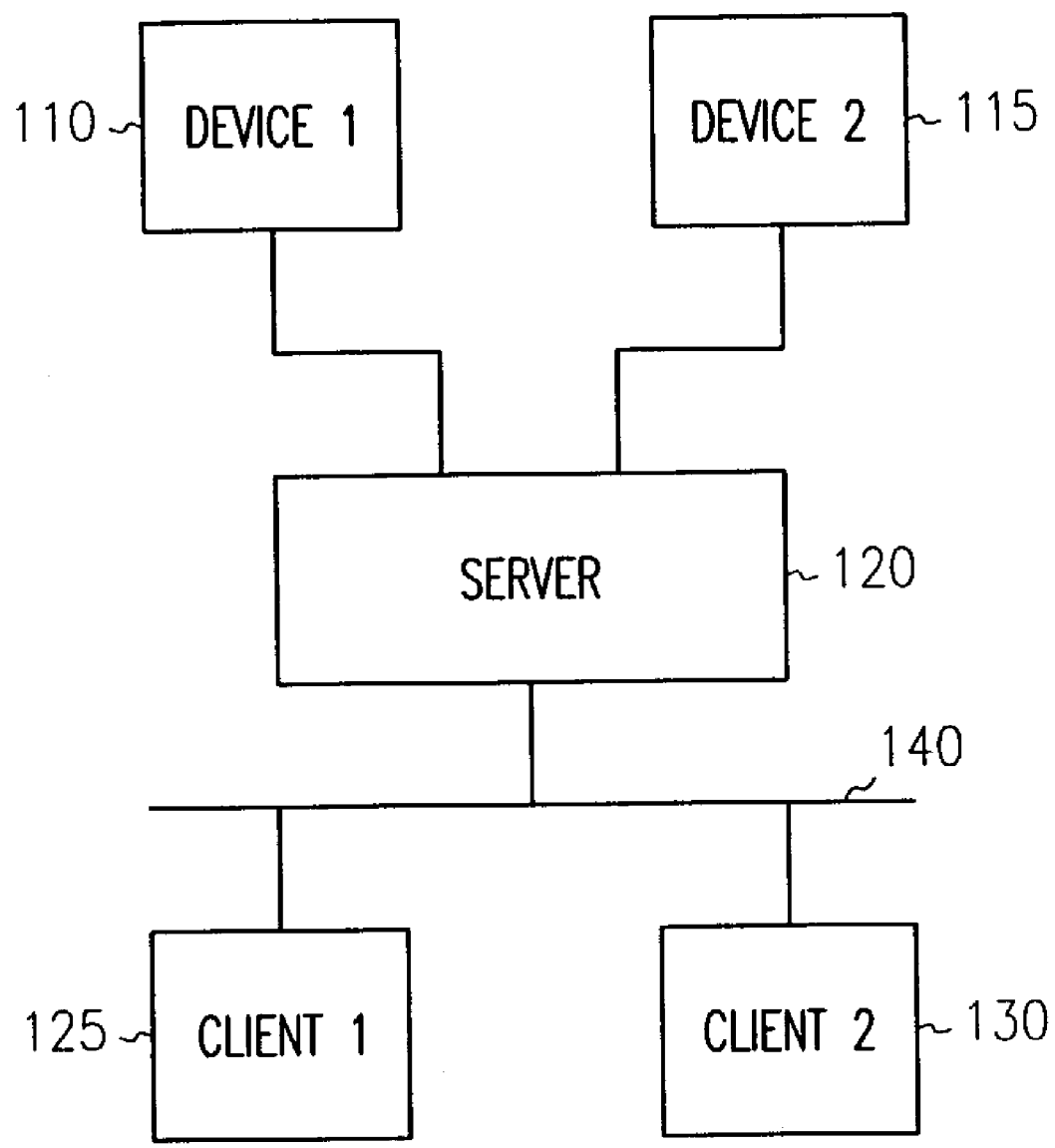
FIG. 1 is a block diagram of an example embodiment of a system utilizing alert processing.

In FIG. 1, a system is shown in block diagram. Devices, such as device 1 and device 2 at 110 and 115 respectively are coupled to a server 120 via a network or other connection. The server 120 is coupled to multiple clients, 125 and 130 via a network 140. In one embodiment, network 140 is an Ethernet network, either hardwired or wireless. Various other methods of communication between server 140 and devices and clients may also be utilized.

In one embodiment, devices comprise printers, scanners, copiers, fax machines, multi-function devices, and other input/output devices. Such devices generate events, such as a fax to be sent, a scan operation, or photos to be printed. Many other such events, including events representative of errors may be generated. An event may give rise to an alert message. Each alert has a signature that identifies it. The signature is based on an alert protocol, such as SNMP traps, as well as information contained in an alert message.

Alerts are processed in accordance with rules that define behavior based on a set of inputs with prescribed outputs. A set of rules that define behavior of alert processing is a policy. Actions are operations performed based on a rule or policy. Received alerts are translated into a common internal representation that all can understand. One such format is an extensible markup language (XML) document. Interpreter components perform such translation in one embodiment. An interpreter is generally something that understands and executes commands on a computer system.

Figure 2:
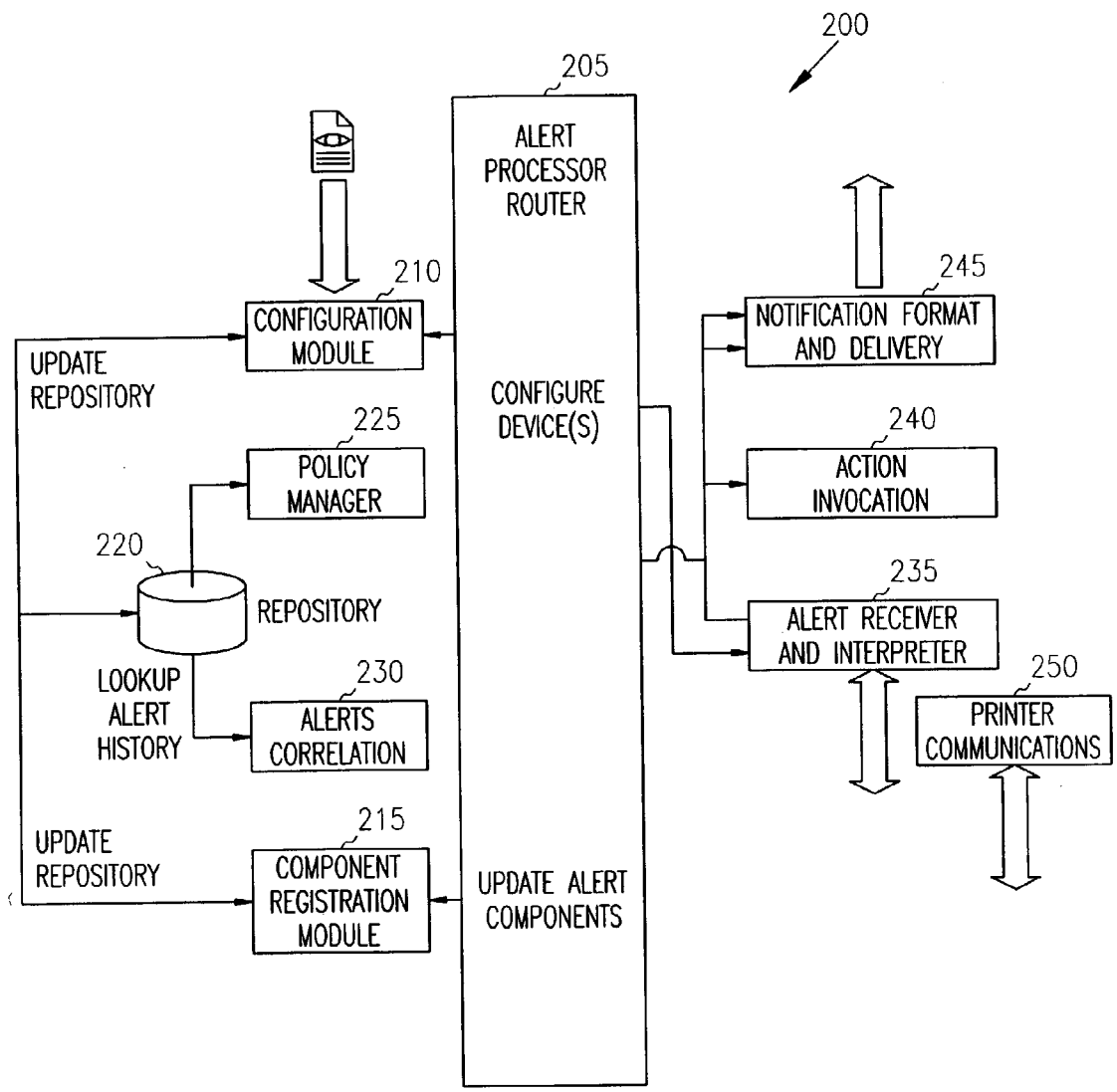
FIG. 2 is a block diagram of an example embodiment of a modular alert processor.

Software modules and components for one embodiment of an alert processing system are shown in FIG. 2 generally at 200. An alert processor router 205 handles operations and messaging flow. It is responsible for the routing of received and formatted messages, sending notification alerts to interested components, and sending messages to invoke actions. A configuration module 210 enables configuration of components, including plug-ins providing additional function. In one embodiment, an administrator performs the configuration. The configuration module 210 triggers the configuration of device parameters to cause the device to send alerts to the alert processor router 205. It enables an administrator to add recipients and to create policies. The configuration of policies is managed through this module. It allows the administrator to identify alerts to process and how to process them as well as provide them to recipients.

A component registration module 215 manages the dynamic discovery of other components as well as their functionality. It also allows the determination of the functionality that each component supports. The component registration module updates a repository 220 of data with information describing such functionality. As an example, when a new delivery component is installed, it sends a message to the component registration module 215. The message contains information about the format of the message that the delivery component supports and the interfaces that can be invoked on it. The component registration module 215 maintains component information in the repository 220. The configuration module 210, and a policy manager 225 use the component registration module to determine available options for alert receivers, actions and notification delivery methods.

The policy manager 225 maintains an association between received alerts, actions to be performed, and notification recipients and the delivery methods. Policies are enforced by rules. Rules are created in the configuration module 210 and are stored in the repository. The policy manager 225 has a rules based engine that exercises these rules when an alert is received.

An alert correlation module 230 looks for trends in the alerts that have occurred. It is an extension of the policy manager, but looks more at the current alert. If an alert that has been received has a rule that associates the alert with other alerts, then the alert correlation module 230 looks in the repository for other alerts. If there is a correlation, then the alert correlation module 230 creates a new alert that consolidates the previous ones.

Repository 220 stores persistent data associated with the alert processor. This includes devices, device attributes, users, registered components, policies and rules, and received alerts.

An alert receiver and interpreter component 235 is broken into several subcomponents: receiver, interpreter, and device communications. The receiver and interpreter are broken into separate components to allow for more flexibility when processing alerts. This model enables a single receiver to enable the processing of multiple alert formats. An example of this would be that the system could be configured so that a single hypertext transfer protocol (HTTP) alert receiver can be used by both a universal plug and play (UPNP) and embedded web server (EWS) alert interpreter.

An alert discovery and signature correlation subcomponent is responsible for querying a managed element to determine what alerts are supported. It may use the receiver, interpreter and device communications components to query the Managed Element or device. It also performs signature correlation that allows the system to determine the meaning of previously unknown alerts. When the system receives an alert that it does not recognize, it will query the state of the Managed element. The system then associates the managed element's state with the received alert.

A receiver interface subcomponent manages receiver plug-ins as well as communications between the router and the plug-ins. Receiver plug-ins provide the ability to receive alerts on a specific transport. For example, one receiver could be able to receive simple network management protocol (SNMP) traps while another could receive HTTP alerts. An interpreter interface subcomponent manages the interpreter plug-ins. It handles messaging and invocation of plug-ins. Interpreter plug-ins provide knowledge of specific alert formats, translated into the system common format. For instance, if a SNMPv1 trap is sent from a printer, the interpreter module for that trap will convert it to the system format. A device communications interface subcomponent manages the device communications plug-ins, handles messaging and invocation of plug-ins. Device communications plug-ins provide the ability to communicate with a specific class or model of device.

An action invocation module 240 provides the ability to perform actions or operations based on received alerts. An action interface subcomponent manages action plug-ins. It handles messaging and invocation of plug-ins. The action plug-ins provide knowledge of specific operations and how to invoke them.

A notification formatting and delivery component 245 is broken into several subcomponents. The formatting and delivery are broken into separate components to allow for more flexibility when sending notification. This model enables a single delivery component to send multiple notification formats. It also enables a single format to be sent via multiple delivery methods. An example of this is that the system 200 could be configured so that both a basic text as well as hypertext markup language (HTML) formatted messages could be sent to a subscriber via email.

A format interface subcomponent manages formatter plug-ins. It handles messaging and invocation of plug-ins. Format plug-ins provide the ability to customize the content and format for notification methods. Delivery plug-ins provide the ability to send notification over a specific transport mechanism such as email or pager. Further methods include but are not limited to prerecorded voice messages or any other method by which a user desires to be notified. A delivery interface manages the delivery plug-ins. It handles messaging and invocation of plug-ins.

A device communications module 250 handles communications directly with devices, such as printers.

FIG. 2 also illustrates configuration of the alert system, the process an administrator could follow to get the system ready for use. The configuration module 210 interacts with the other modules primarily through the repository with the router 205 providing direct communications. The administrator interacts with an interface provided by the configuration module 210 to set up the system 200. The component registration module 215 automatically updates the repository to give an administrator or user choices of devices and their attributes, alerts, installed receivers, interpreters, actions, format and delivery.

Configuration consists of the following subtasks:
1. Configure devices to send alerts to the system
   a. Configuration module 210 gets a list of discovered devices in the repository. It also provides information on supported alerts, and formats.
   b. The administrator selects a device or set of devices to configure alerts on.
   c. Configuration module 210 sends a configuration command to the printer communication module.
   d. Configuration module 210 updates the repository with the newly available devices and their alerts.
2. Subscribe to alerts.
   a. Administrator gets a list of currently available devices and alerts from configuration module 210
   b. Administrator selects the alerts to receive, users who will receive them and their notification options.
3. Configure subscriber settings.
   a. Administrator gets a list of possible recipients from the repository (or adds new users through this interface).

b. Administrator selects devices, printers and associated alerts, notification method and delivery method.
4. Configure policies.
   a. Configuration module 210 obtains current policies from repository
   b. Administrator can edit policies or add new ones.
   c. Definition or policies include alerts to exercise policy on, filtering to be performed, event correlation to be performed, actions to be invoked and any notifications that need to occur.

Figure 3:
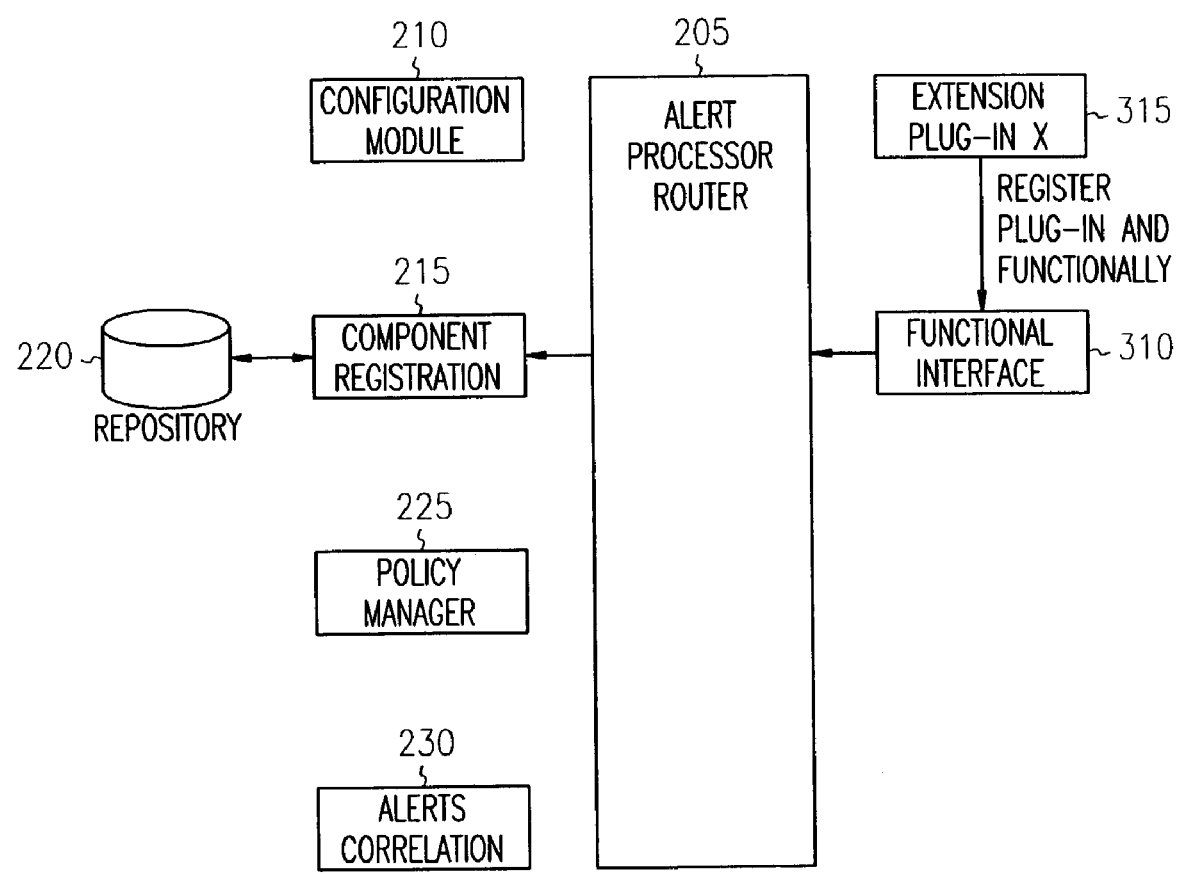
FIG. 3 is a block diagram of an example embodiment showing component registration.

FIG. 3 illustrates component registration using portions of the system shown in FIG. 2. A functional interface 310 is coupled to alert processor router 205. When a new component, such as a plug-in 315 is installed, it registers itself with an associated functional interface component 310. Such interfaces may be format, delivery, receiver, interpreter, action, and device communications interfaces among others. The plug-ins provide methods to implement associated functions. Registration consists of identification of the operations, providing information about the behavior and formats that the operations support. The functional interface component 310 uses the alert processor router 205 to pass this information to the component registration module 215. The extension information is stored in repository 220.

Figure 4:
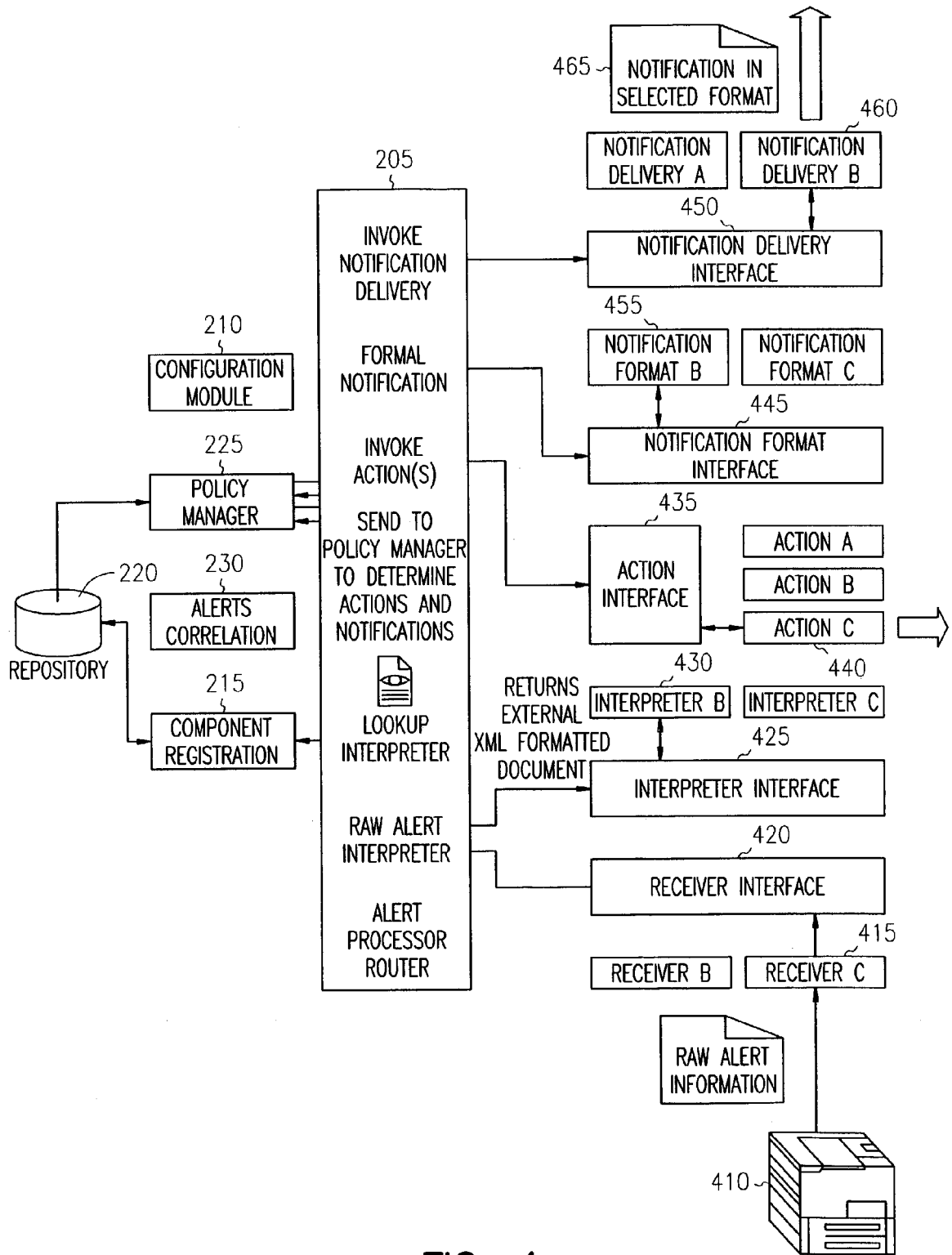
FIG. 4 is a block diagram of an example embodiment showing the handling of received known alerts.

FIG. 4 illustrates processing occurring upon receipt of a known alert receipt using portions of the system shown in FIG. 2. In addition, several interfaces are shown. An event occurs at a device, such as a multi-function device 410. Device 410 is also referred to as a managed device or element. It generates an alert corresponding to the event. A receiver 415, which has registered to receive alerts of that format from that device, receives raw alert information. The raw alert information is passed through a receiver interface 420 over to an interpreter interface 425. The interpreter interface 425, in conjunction with interpreter extension components 430, determines which interpreter extension component will perform a translation based on an alert signature. In an alternative embodiment, the alert signature is handled by having signatures or extension component mapping contained in the registry, and having the interpreter interface perform the initial processing.

The extension component 430 translates the raw alert information into a common internal alert format, such as an XML document. This information is then passed back to the alert processor router 205, which passes the alert information to the policy manager 225. The policy manager 225 inspects the alert and determines if any rules have been associated with the alert. If an action has been selected for the alert, the policy manager passes the alert and action information to an action interface 435. If an action has been selected for the alert, the policy manager 225 passes the alert and action information to an action interface 435. The action interface 435 invokes an appropriate extension component 440 to perform the selected action. If user(s) have subscribed for notification of event(s), the policy manager determines their preferred notification method(s) and format(s), invoking the notification format and delivery interfaces 445 and 450 that in turn invoke appropriate extension components 455 and 460 respectively. A notification 465 is sent in both the user selected format and delivery mechanism.

Figure 5:
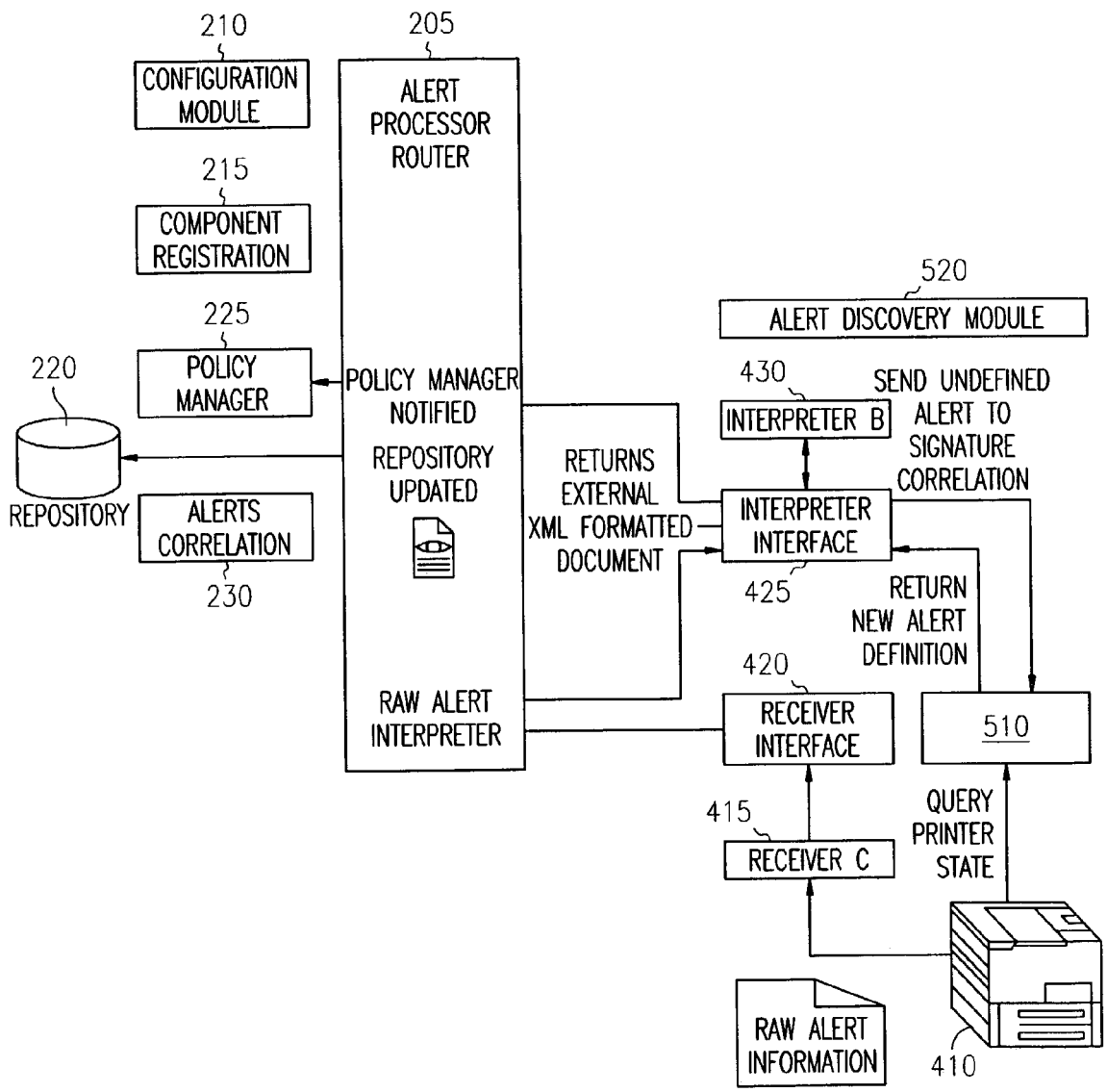
FIG. 5 is a block diagram of an example embodiment showing the handling of received unknown alerts.

FIG. 5 illustrates processing to correlate a new event to determine its meaning. An educated guess is made as to the meaning of an event when the system lacks knowledge of the actual meaning. In one embodiment, a user is given a choice of automatically accepting the interpretation, reviewing it prior to accepting, or having it put into an unknown bin for future use. A managed device 410 sends raw alert information to the receiver 415 and receiver interface 420. If the interpreter component 430 does not recognize the alert, it passes it to an alert signature correlation module 510. The alert signature correlation module 510 queries the managed device 410 in an attempt to match its state with a known event category supported by the system. If the alert signature correlation module 510 is able to make a match, it generates a system internal alert and passes this information back to the interpreter interface to be routed as a normal alert. In addition, it sends a message back to the interpreter interface that causes the interface to update the repository with the new alert signature. Future receipts of this signature will be handled by the interpreter interface directly.

Figure 6:
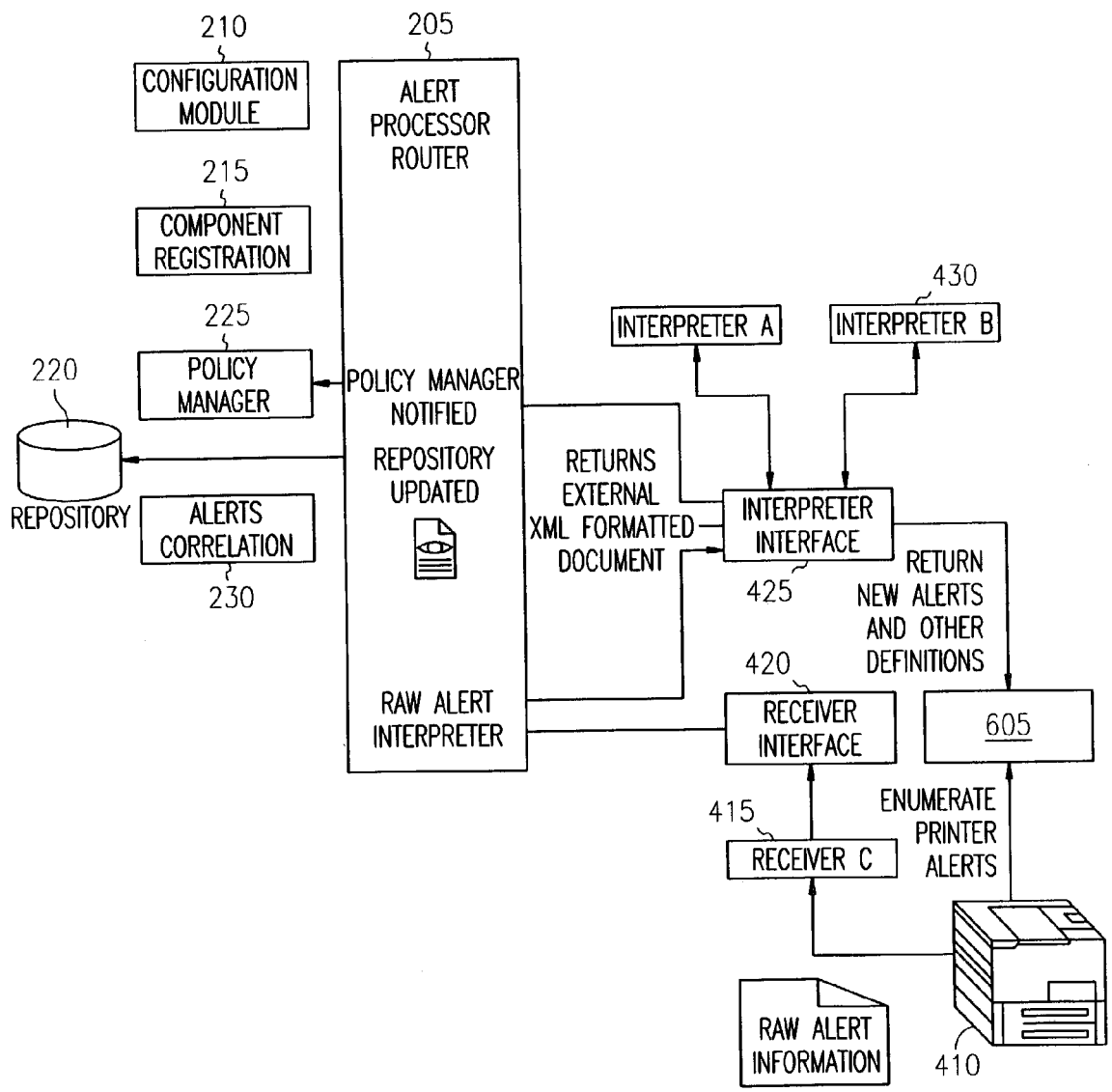
FIG. 6 is a block diagram of an example embodiment showing the handling of new alerts.

FIG. 6 illustrates processing occurring to discover available alerts. When a new device 410 is discovered by the system, such as by automatic managed system registration (service location protocol (SLP) over multicast) or by manual search. SLP provides users an easy-to-use interface to a network's resource information. The protocol defines and oversees communications and operations that take place among entities called user agents (subscribers or workstations), service agents (peripherals and resources), and directory agents (peripherals and resources within service agents). The alert processing system determines that the event model on the managed system is not currently known. The interpreter interface 425 triggers an alert discovery module 605 to query the device for supported alerts. The information is passed back to the interpreter 425, which in turn updates the repository. The system is then able to notify users who want to receive notification of newly discovered alerts. The user may also specify that they would automatically be subscribed to any newly discovered alerts that are in the same category of the ones they have currently subscribed to.

Figure 7:
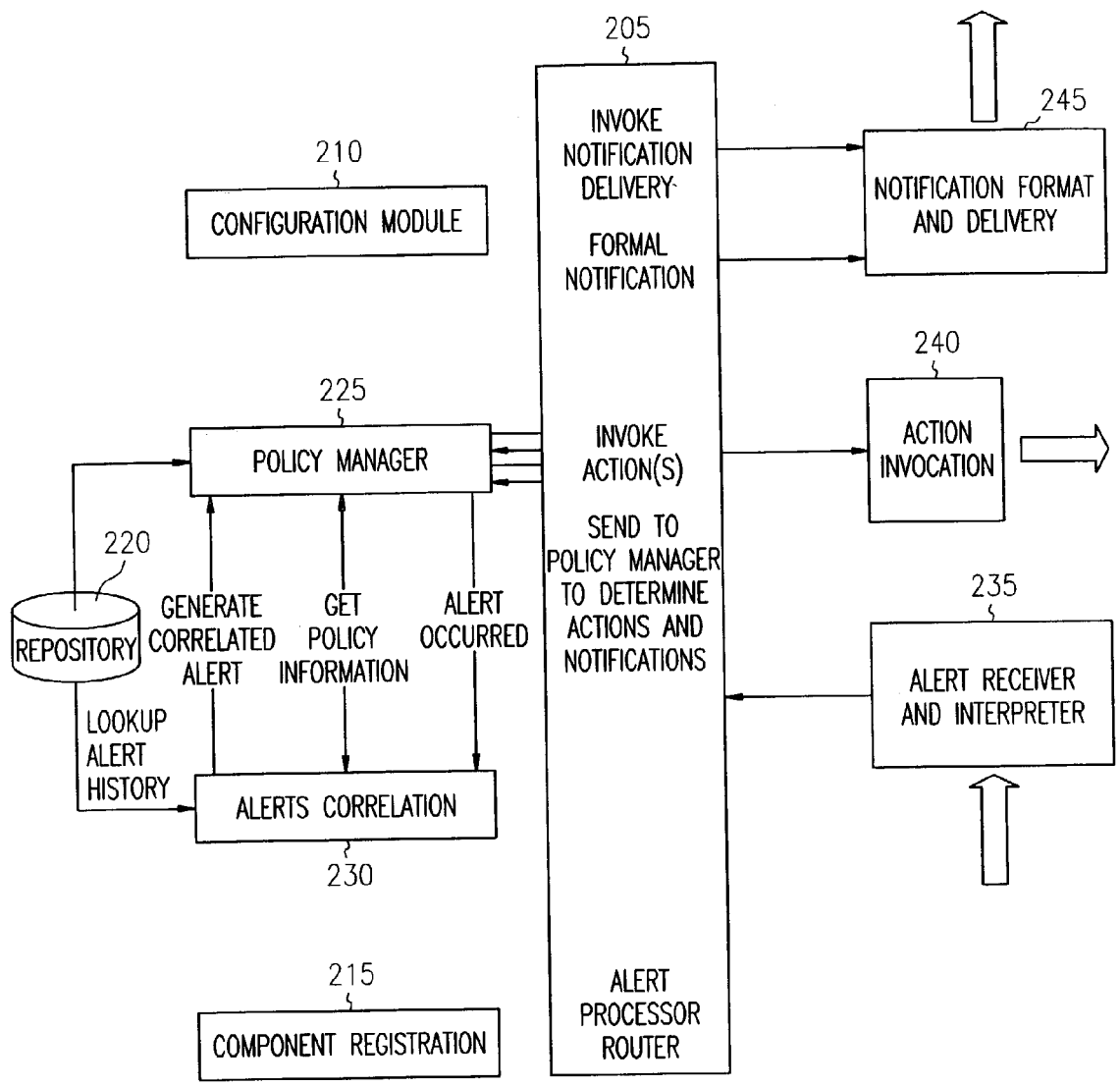
FIG. 7 is a block diagram of an example embodiment showing correlation of multiple alerts.

FIG. 7 illustrates processing to correlate multiple events to determine the cause of a problem or status of a managed device. An actual problem may not be obvious from a single alert. The cause may become apparent in the context of other alerts through event correlation. An alert is received, translated and passed to the policy manner in a normal manner. The policy manager determines that there are some rules associated with the alert that require event correlation. The event is then passed to the event correlation engine. The event correlation engine considers the current alert as well as previously received alerts stored in the repository. If the pattern of alerts matches some known correlated event, then the event correlation engine generates a new consolidated event. This event is then passed back to the policy manager to complete the actions and notifications steps.

In one embodiment, the architecture of the alert processing system is modular in nature, permitting dynamic registration and multiple component use of new functionality. Multiple alert protocols and formats may be supported. Further, alerts may be delivered in multiple formats via multiple delivery mechanisms. In some embodiments, alerts from a managed element are discovered by the alert processing system. Further, new alert processing rules may be generated. Still further, users may be notified of newly discovered alerts and new kinds of alerts being available. New types of alerts may be interpreted and processed by correlation to known states of managed elements. Further, managed elements may be queried to determine their state to attempt to determine the meaning of the alert.

Figure 8:
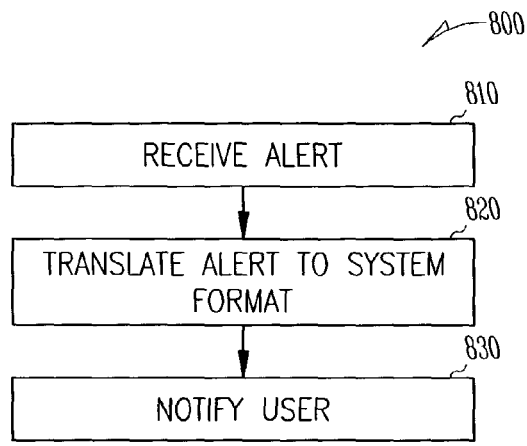
FIG. 8 is a flowchart of an example embodiment showing alert processing.

Several flowcharts are provided in FIGS. 8–12 to illustrate example methods. In FIG. 8 at 800, a method of processing alerts comprises receiving an alert at 810 and translating the alert to a system format at 820. The user is then notified about the alert at 830 in a user identified manner.

Figure 9:
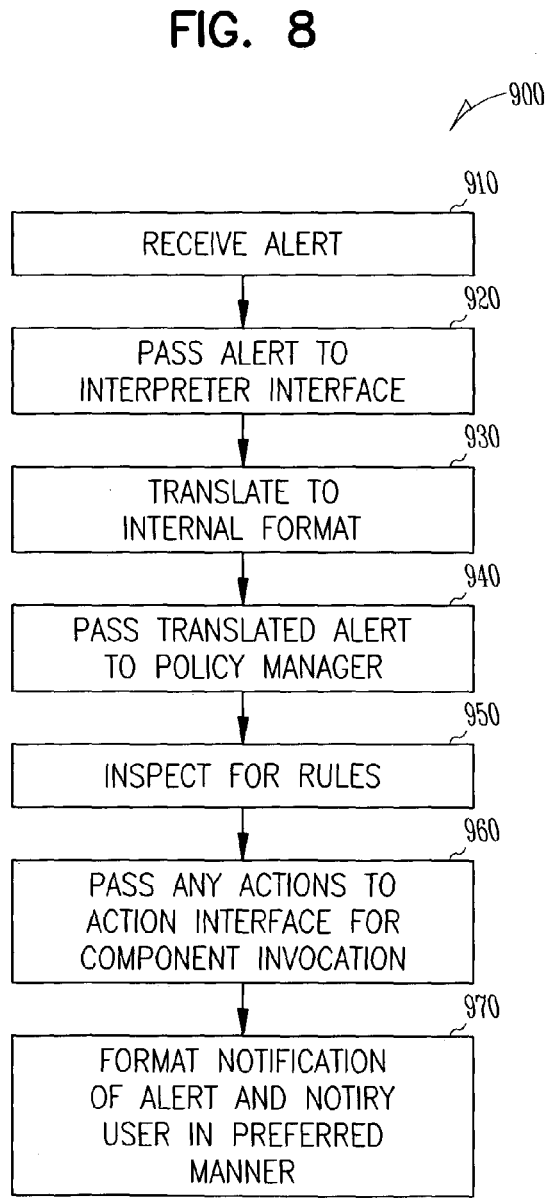
FIG. 9 is a flowchart of a further example embodiment showing alert processing with rules.

In FIG. 9, an alternative method of processing alerts is shown generally at 900. The method comprises receiving an alert from a managed device representative of an event at 910. At 920, the alert is passed from a receiver interface to an interpreter interface, and translated into a common internal alert format at 930. At 940, the translated alert is passed to a policy manager. The alert is then inspected at 950 to determine if rules are associated with the translated alert. At 960, if an action is selected for the alert, the alert is passed along with action information to an action interface for invocation of a component to perform the action. If a user has subscribed for notification of events, at 970, it is determined if a preferred notification method and format is specified, and notification format and delivery interfaces are invoked.

Figure 10:
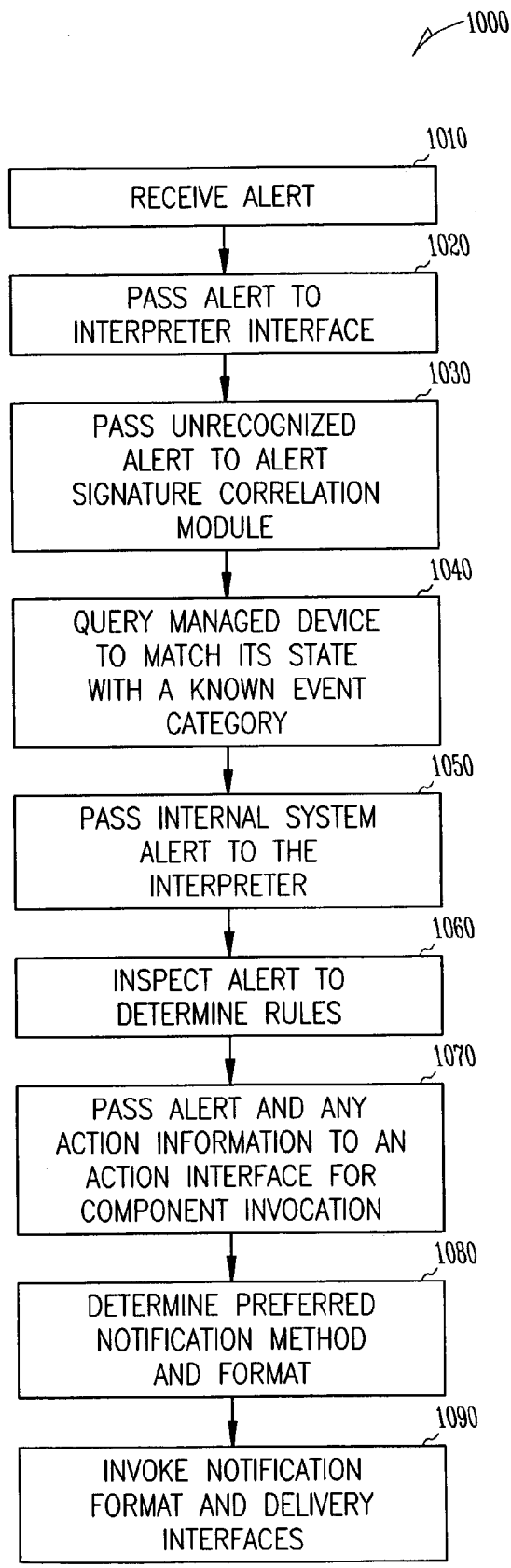
FIG. 10 is a flowchart of a further example embodiment showing alert processing with alert signature correlation.

FIG. 10 illustrates yet another method of processing alerts generally at 1000. The alert is received 1010 from a managed device, and represents an event at that device. At 1020, the alert is passed from a receiver interface to an interpreter interface. Unrecognized alerts are passed to an alert signature correlation module at 1030. The managed device is queried at 1040 to match its state with a known event category. An internal system alert is passed to the interpreter at 1050. The alert is then inspected at 1060 to determine if rules are associated with the translated alert. At 1070, if an action is selected for the alert, the alert and action information are passed to an action interface for invocation of a component to perform the action. It is determined at 1080 if a user has subscribed for notification of events. If so, at 1090, a preferred notification method and format are determined and notification format and delivery interfaces are invoked.

Figure 11:
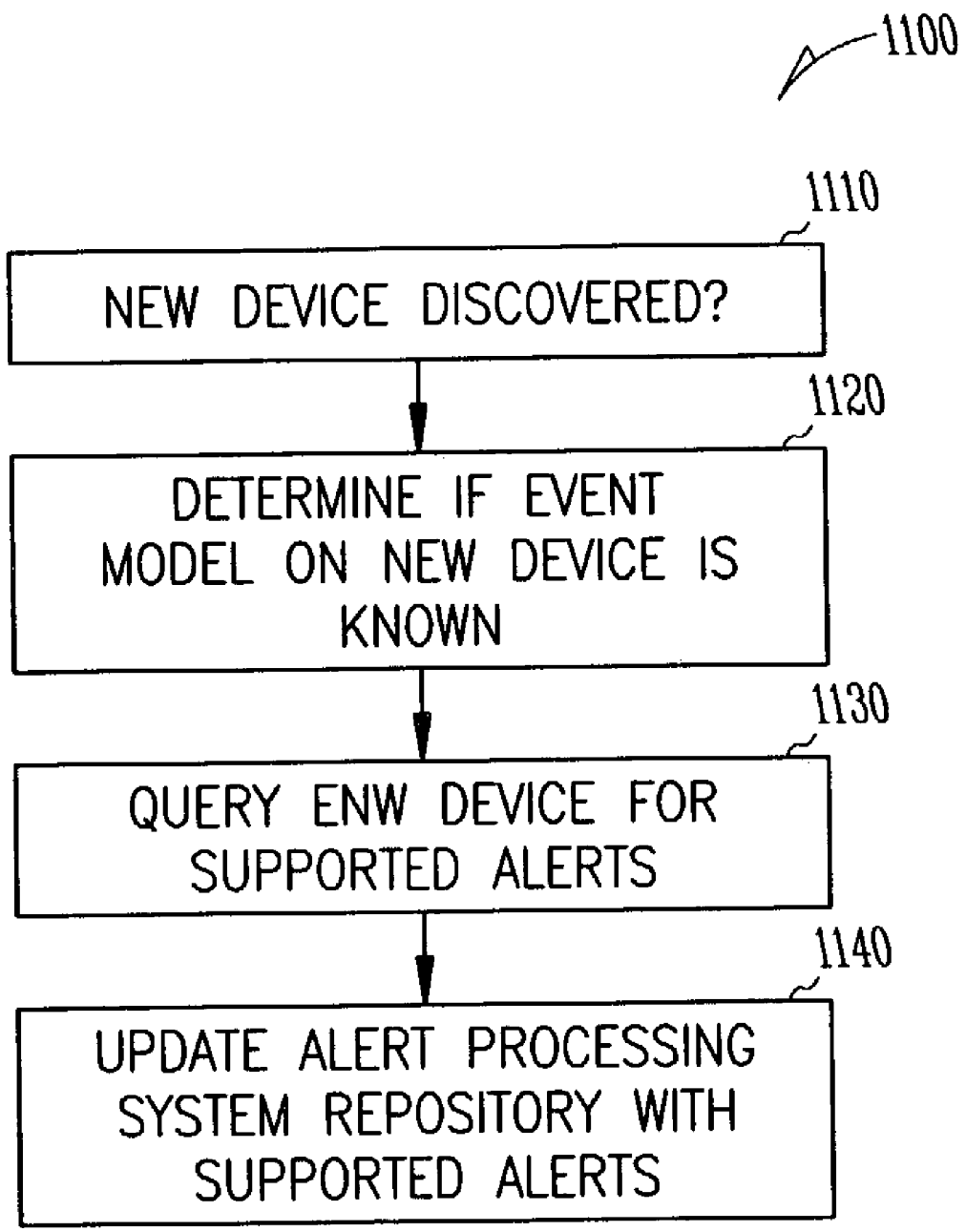
FIG. 11 is a flowchart of a further example embodiment showing alert processing with new device querying.

FIG. 11 illustrates a further method of processing alerts in an alert processing system at 1100 where new devices are detected. A new device coupled to the alert processing system is discovered at 1110, it is determined at 1120 that an event model on the new device is not currently known by the alert processing system. The new device is queried for at 1130, and an alert processing system repository is updated with the supported alerts at 1140.

Figure 12:
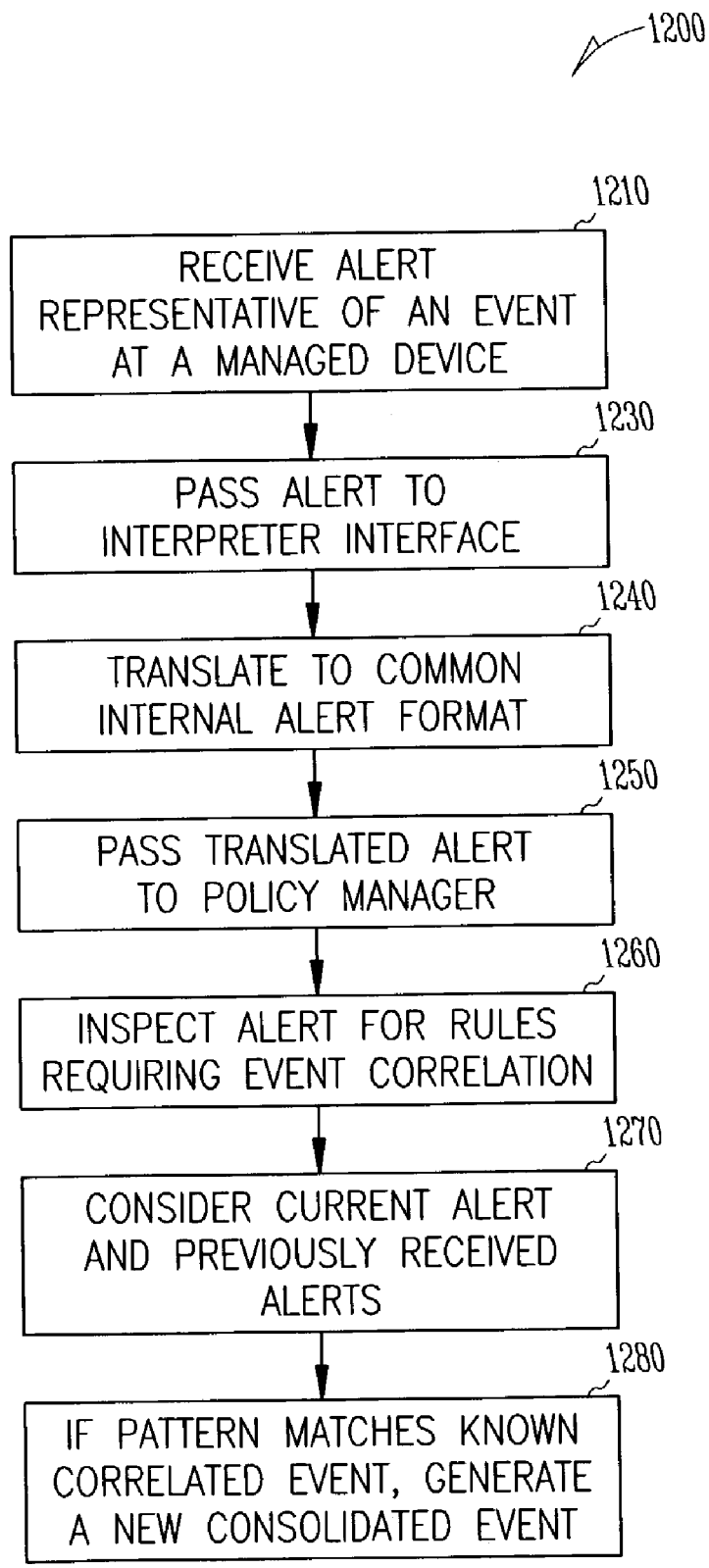
FIG. 12 is a flowchart of a further example embodiment showing alert processing with consolidation of events.

FIG. 12 illustrates an example embodiment for processing alerts at 1200 where patterns of alerts are matched. At 1210, an alert from a managed device representative of an event is received. The alert is passed from a receiver interface to an interpreter interface at 1230. It is then translated 1240 into a common internal alert format and passed 1250 to a policy manager. At 1260, alerts are inspected to determine if rules associated with the translated alert require event correlation. The current alert as well as previously received alerts are considered at 1270, and if a pattern of alerts matches some known correlated event, a new consolidated event is generated at 1280.

What is claimed is:

1. A method of processing alerts, the method comprising:
   receiving an alert;
   translating the alert to a system format;
   if a meaning of the alert is unknown, correlating a plurality of known alerts to determine the meaning of the unknown alert; and
   notifying a user about the alert in a user identified manner.

2. The method of claim 1 wherein the alert is received from a managed element, and further comprising querying the managed element.

3. The method of claim 2 wherein the managed element is queried to determine the alerts supported.

4. The method of claim 2 wherein the managed element is queried to determine its state.

5. The method of claim 1 and further comprising interpreting the alert.

6. The method of claim 1 wherein the user identified manner is email or pager.

7. The method of claim 1 wherein the user identified manner comprises a format.

8. A method of processing alerts, the method comprising:
   receiving an alert from a managed device representative of an event;
   translating the alert into a common internal alert format;
   inspecting the alert to recognize the event and to determine if rules associated with the translated alert requires event correlation;
   if the event is not recognized, considering the alert as well as previously received alerts to determine a meaning of the event; and
   if a pattern of alerts matches a known correlated event, generating a new consolidated event that is associated to the event.

9. The method of claim 8 and further comprising passing the new consolidated event to a policy manager.

10. The method of claim 9 and further comprising:
    inspecting the alert to determine if rules are associated with the translated alert;
    if an action is selected for the alert, passing alert and action information to an action interface for invocation of a component to perform the action; and
    if a user has subscribed for notification of events, determining a preferred notification method and format and invoking notification format and delivery interfaces.

11. A computer readable medium having instructions for causing a computer to perform a method, the method comprising:
    receiving an alert from a managed device representative of an event;
    translating the alert into a common internal alert format;
    inspecting the alert to recognize the event and to determine if rules associated with the translated alert requires event correlation;
    if the event is not recognized, correlating the alert with previously received alerts to determine a meaning of the event; and
    if a pattern of alerts matches a known correlated event, generating a new event that is associated to the alert.

* * * * *